May 17, 1949.    R. GRAY    2,470,163
PLATE SUPPORT FOR ELECTRIC ACCUMULATORS
Filed Nov. 29, 1944    2 Sheets-Sheet 1
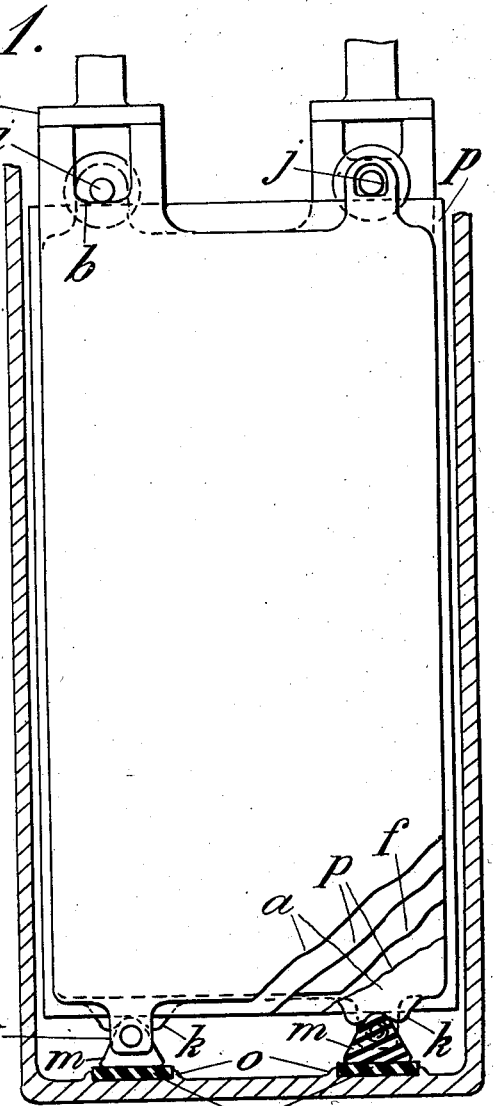
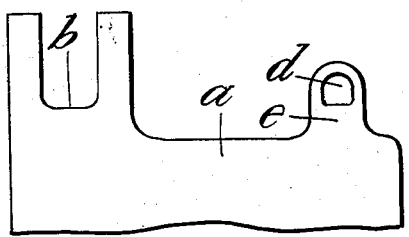
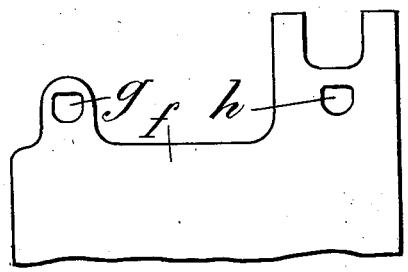
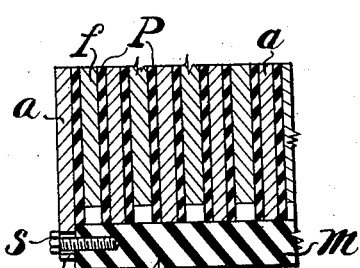
INVENTOR:-
ROBIN GRAY
BY
Edward J. Dwyer
ATTORNEY May 17, 1949. R. GRAY 2,470,163
PLATE SUPPORT FOR ELECTRIC ACCUMULATORS
Filed Nov. 29, 1944 2 Sheets-Sheet 2
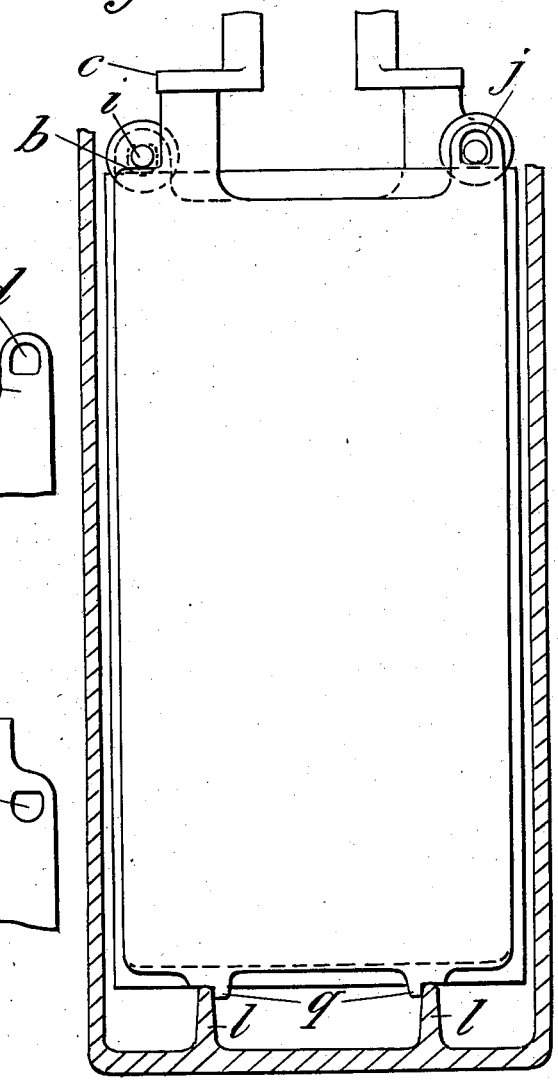
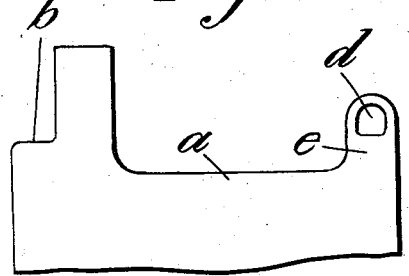
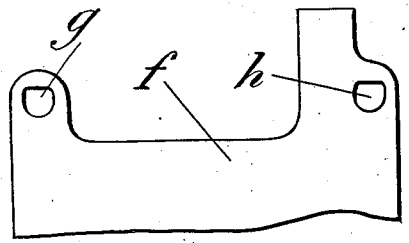
INVENTOR:-
ROBIN GRAY
BY
ATTORNEY Patented May 17, 1949

2,470,163

UNITED STATES PATENT OFFICE 2,470,163

PLATE SUPPORT FOR ELECTRIC ACCUMULATORS

Robin Gray, Clifton Junction, near Manchester, England, assignor to The Electric Storage Battery Co., a corporation of New Jersey Application November 29, 1944, Serial No. 565,692
In Great Britain November 12, 1943

Section 1, Public Law 690, August 8, 1946
Patent expires November 12, 1963

5 Claims. (Cl. 136—79)

1

This invention relates particularly to pasted plate and tubular plate types of lead-acid electric accumulators having tall plates or electrodes. In such tall accumulators, the positive plates show appreciable vertical growth in service and to allow for this it has been customary to suspend the positive plates from the container walls or from the cell lid, which allows of plate growth in service without disturbing the positions of the terminal lugs and posts. In some cases the container walls have not sufficient strength to support the weight of the plates and in other cases where the containers are liable to shock in service, there is the danger of the container being fractured against the inertia of the plates suspended therefrom during shock.

In accordance with my present invention, I overcome the disadvantages above referred to and reduce the danger of container fracture by suspending the positive plates from the upper portions of the negative plates (so that the positive plates can grow downwards) and by supporting the negative plates (and therefore the weight of all the plates) from the floor of the container, preferably upon resilient supports.

Referring to the accompanying explanatory drawings—

Figure 1 is a sectional elevation of a lead-acid accumulator cell with the plates supported and arranged in one convenient form in accordance with this invention.

Figure 2 shows the upper portion of a negative plate.

Figure 3 shows the upper portion of a positive plate.

Figure 3a is a side sectional view of plate supporting means $m$ shown in Figure 1.

Figures 4, 5 and 6 are views similar to 1, 2 and 3 but showing a modified construction.

The top of each negative plate $a$ is provided with a bearing surface $b$, preferably above the separators $p$, towards one side of the plate and towards or beneath its connection to the terminal bar $c$, and with a hole or eyelet $d$ in a lug $e$ thereon at its other side. Each positive plate $f$ has two holes or eyelets $g$, $h$ therein at the opposite sides of its top and in alignment with $b$ and $d$. Insulating rods $i$ and $j$ are threaded through the holes or eyelets in the plates as they are assembled so that when the plates are in their upright position, the positive plates are suspended from the rods which are supported by the negative plates. The shape of the holes or bearing surfaces for the rods is such as to allow sideways

2 movement sufficient to accommodate normal widthways growth of the positive plates.

The negative plates other than the end plates in the cell have notched recessed lugs $k$ on their bottom ends which seat upon appropriately shaped, for instance triangular, bars or rods $m$ carried by rubber or like chemically inert resilient pads $n$ located between raised ribs $o$ on the container base or on an ebonite or like mat in the bottom of the cell container. The end negative plates are secured to the ends of the bars or rods $m$ by screws $s$ or otherwise which pass through lugs $q$ on such end plates. This acts to tie the plate assembly together and prevent splaying of the end plates.

With the arrangement described, it will be appreciated that the plate assembly of an accumulator cell can be readily lifted bodily by the positive and negative terminal posts of the cell.

The separators $p$ between the plates are supported on the bars or rods $m$.

In the alternative construction shown in Figures 4, 5 and 6, the negative plates are supported by ribs $l$ on the container base, the side movement of the negative plates being controlled by lugs $q$ on the plate feet. In this arrangement the plate groups as not tied at the bottom.

What I claim is:

1. An electric accumulator element adapted for insertion in a container and comprising a plurality of positive plates, a plurality of negative plates, straps connecting plates of like polarity, separators interposed between adjacent plates, shoulders on the upper portions of said plates, longitudinally extending rods on said negative plates, resting on said shoulders, means on said positive plates resting on said rods to support said positive plates, the end plates being of negative polarity and having pairs of opposed downwardly depending lugs, a pair of longitudinally extending bars received between opposed pairs of lugs and spaced from the bottom edges of the positive plates, whereby the positive plates are free to grow downwardly, the intermediate negative plates resting on said bars and having lug means engaging opposed edges of said bars to prevent transverse movement of the negative plates relative to said bars, and means securing the lugs on the end plates to said bars.

2. In an electric accumulator cell of the lead acid type, the arrangement in which the positive plates are suspended from the upper portion of the negative plates, and the negative plates are supported from the floor of the cell container, the support means for the negative plates including at least one longitudinally extending bar associated with the cell container floor and received between the end negative plates and spaced from the bottom edges of the positive plates, whereby the positive plates are free to grow downwardly, the intermediate negative plates resting on said bar, and means securing the end plates to said bar.

3. In an electric accumulator cell as claimed in claim 2, supporting the positive plates from the negative plates by rods of insulating material which pass through holes in the upper parts of the assembled plates.

4. In an electric accumulator cell as claimed in claim 2, supporting the bar beneath the negative plates upon resilient pads interposed between the bar and the floor of the cell container.

5. In an electric accumulator cell as claimed in claim 2, the provision of lug means on said intermediate negative plates engaging opposed sides of said bar to prevent transverse movement of the negative plates relative thereto.

ROBIN GRAY.

REFERENCES CITED

The following references are of record in the file of this patent:

UNITED STATES PATENTS

| Number | Name | Date |
|---|---|---|
| 397,557 | Knowles | Feb. 12, 1889 |
| 1,370,011 | Ford | Mar. 1, 1921 |
| 1,480,764 | Koch | Jan. 15, 1924 |
| 1,744,896 | Holland | Jan. 28, 1930 |
| 2,257,489 | Wells | Sept. 30, 1941 |

FOREIGN PATENTS

| Number | Country | Date |
|---|---|---|
| 8,855 | Great Britain | Aug. 17, 1889 |
| 16,876 | Great Britain | 1898 |
| 442,022 | Great Britain | Jan. 30, 1936 |